April 16, 1929.  J. M. JUNG  1,709,023
MACHINE FOR MIXING EGGS
Filed May 29, 1926  3 Sheets-Sheet 1

Inventor
John M. Jung
By
Lynn H. Lalla
Attorney

April 16, 1929.  J. M. JUNG  1,709,023
MACHINE FOR MIXING EGGS
Filed May 29, 1926    3 Sheets-Sheet 2
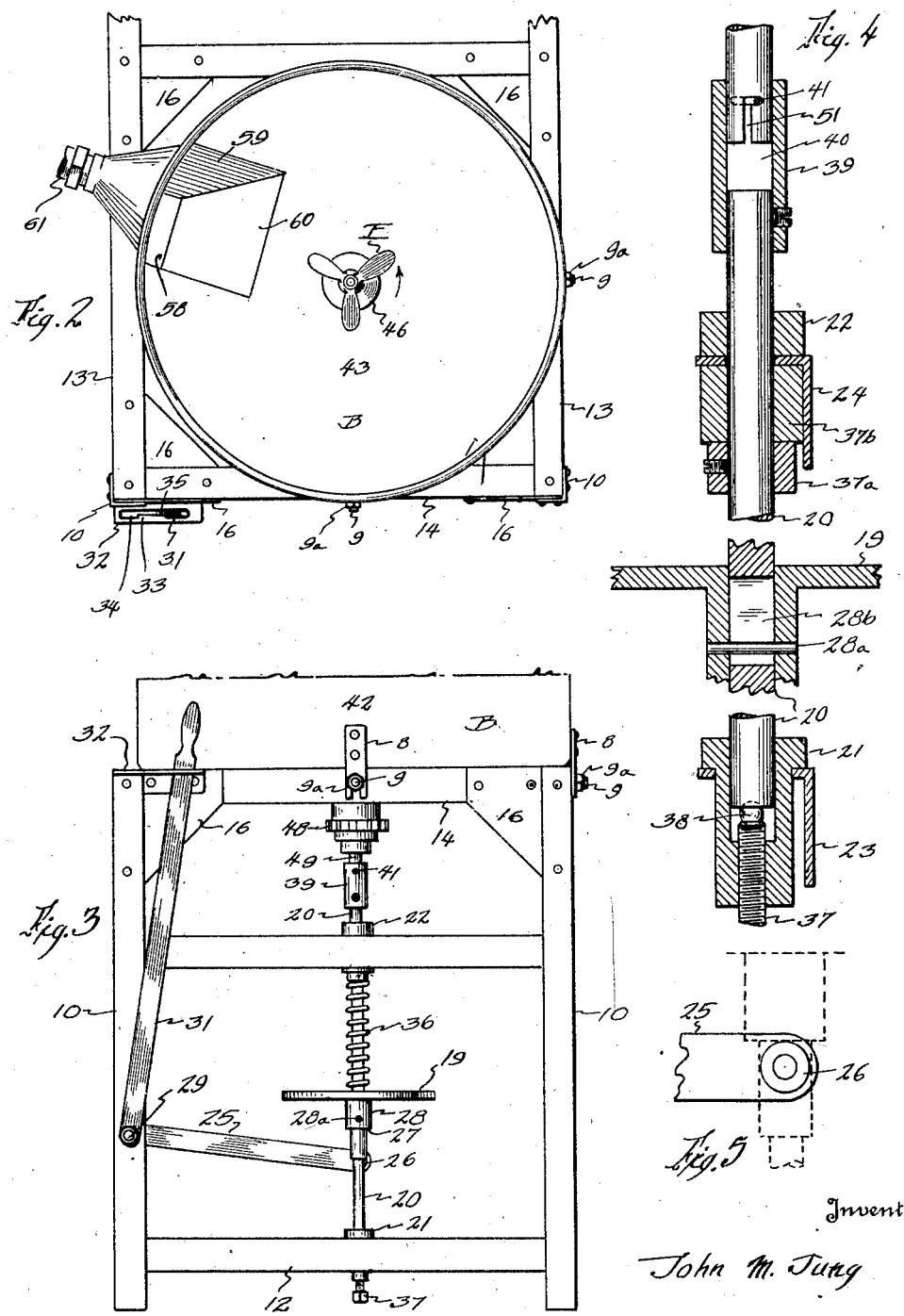

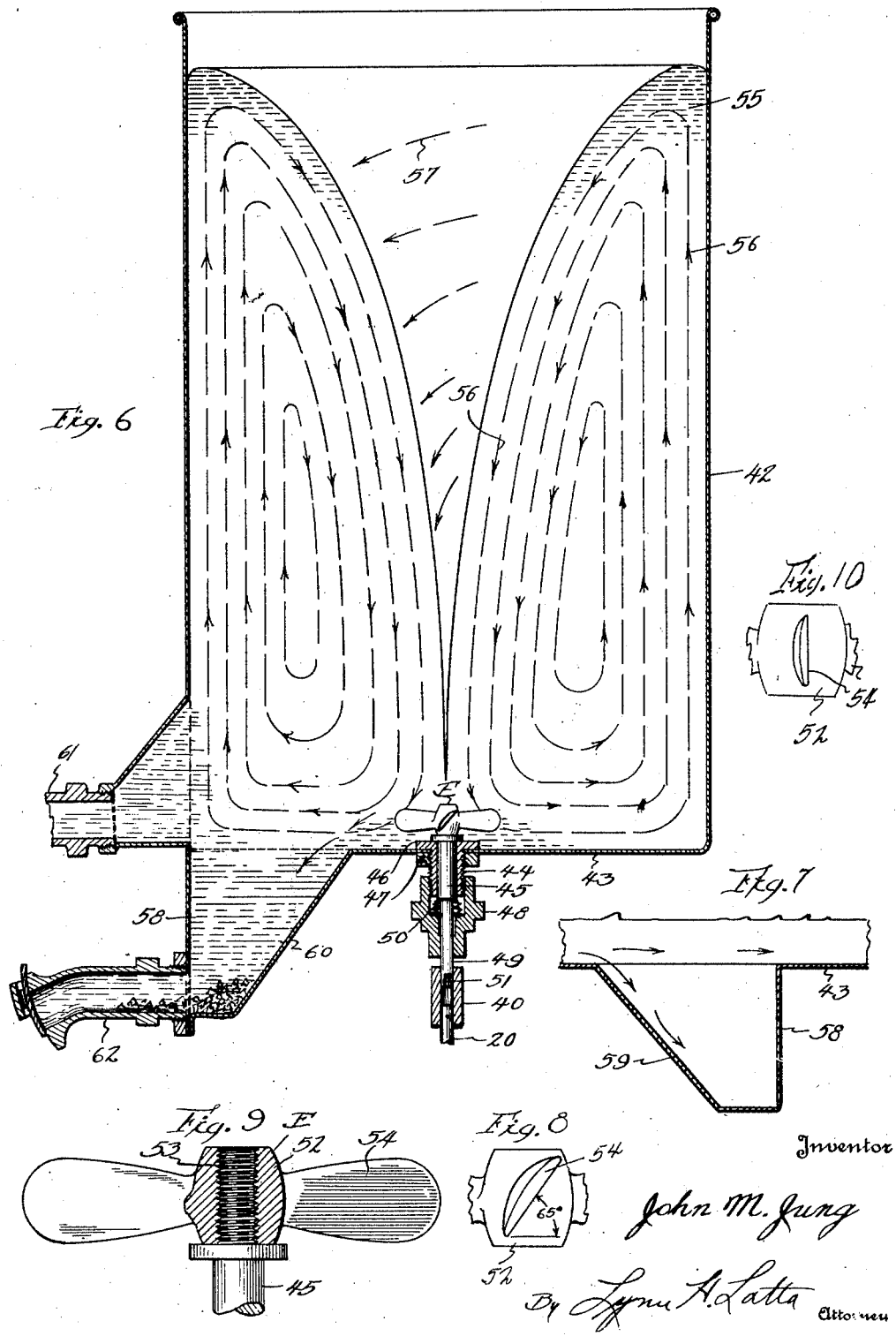

Patented Apr. 16, 1929.

1,709,023

UNITED STATES PATENT OFFICE.

JOHN M. JUNG, OF SIOUX CITY, IOWA.

MACHINE FOR MIXING EGGS.

Application filed May 29, 1926. Serial No. 112,551.

My invention relates to the art of mixing eggs wherein the eggs are broken, tested, the yolks and whites commingled or mixed to produce a fluid of substantially uniform texture, and then frozen in containers for shipment to the consumers of the product, such as the manufacturer of bakery products.

The object of the present invention is to provide a machine of simple, durable and inexpensive construction which is especially adapted to reduce the mingled masses of the egg yolks and whites to a substantially uniform mixture, with a minimum amount of power.

The primary object of the invention is to mix the eggs without producing air bubbles in the fluid mass and without "whipping" the fluid. In freezing the eggs for shipment it is desirable that there be no froth caused by such whipping present upon the surface of the fluid, and no air bubbles in the fluid, since these qualities detract from the marketability of the product.

In carrying out the invention I employ a machine including a tub or receptacle for the eggs, and an agitating element which operates upon the mass of fluid to set it in motion in such a manner as to exert a drawing or stretching action between the adjacent particles of every portion of the mass, and which will, however, direct the fluid along such paths that there will be no conflict between the currents set up in the mass.

Such a treatment I find is admirably suited to the purpose of mixing a viscous fluid such as the liquid portion of eggs, and I attribute this to the peculiar quality which such fluids possess, namely, that their molecules have such an affinity for each other that they will not flow freely among themselves except under mechanical stress, and yet are as readily separated by a drawing or stretching action as would be the molecules of an actual liquid such as water.

Another object of the invention is to provide a machine which will, in mixing the eggs, cause all of the particles of shell and foreign matter of greater specific gravity than the fluid to settle out from the mass of the fluid into a pocket designed to receive such foreign material.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 2 is a plan view of approximately half the machine.

Fig. 3 is an end elevation of the lower portion of the machine.

Fig. 4 is a vertical sectional view taken on the line 4—4 of Fig. 3.

Fig. 5 is an enlarged detail view illustrating a portion of the shifting lever.

Fig. 6 is a vertical sectional view taken centrally through one of the tubs and illustrating in diagram the action of the propeller upon a mass of fluid contained within the tub.

Fig. 7 is a detail sectional view of the sediment pocket taken on the line 7—7 of Fig. 6.

Fig. 8 is a detail drawing of a portion of the propeller.

Fig. 9 is a detail sectional view illustrating the connection of the propeller with the propeller shaft, and Fig. 10 shows a modified form of the propeller.

Figure 1:
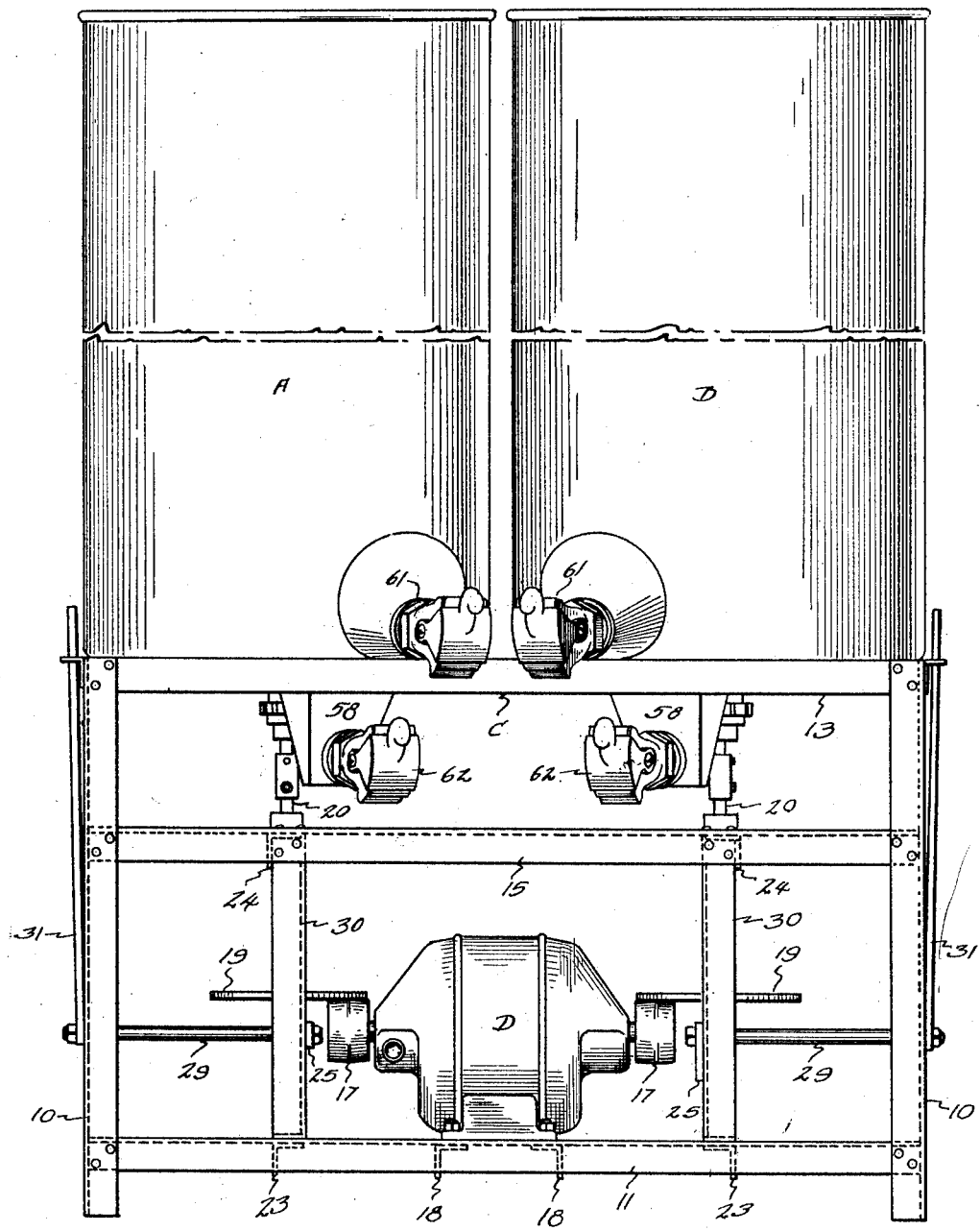
Fig. 1 is an elevation of a duplex machine embodying two egg tubs or receptacles.

In the preferred form of my invention I employ a pair of receptacles, A and B, removably secured to a frame structure, C, by means of forks, 8, which receive studs, 9, and are fastened by nuts, 9ª, threaded thereon. The tubs have agitating elements E which are driven from a single source of motive power, D. The frame, C, preferably includes the corner uprights, 10, connected by the lower side bars, 11, and lower end bars, 12, the upper side bars, 13, and upper end bars, 14, and the intermediate side bars, 15. Corner plates, 16, connecting the uprights, 10, with the upper end bars, 14, serve to rigidify the entire structure.

The power plant, D, which in the accompanying illustration is shown as an electric motor having a double-ended armature shaft provided with the two friction pulleys, 17, is mounted upon the central cross members, 18.

Each propeller drive unit includes the friction disc, 19, which is slidably mounted upon the shaft, 20, by means of a pin, 28ª, secured in the hub, 28, of the disc and extending through a slot, 28ᵇ, in the shaft, 20. The shaft, 20, is journaled in the bearings, 21 and 22, secured to lower and upper drive shaft frame elements, 23 and 24, respectively. The disc, 19, being slidable vertically on the shaft, it may be lifted from contact with the friction pulley, 17.

A lever, 25, carries a pulley, 26, which engages a shoulder, 27, upon the friction disc hub, 28, and when the lever, 25, is moved upwardly, the contact of the roller, 26, will lift the disc, 19, from engagement with the pulley, 17. The lever, 25, is carried upon the end of a shaft, 29, journaled in the end uprights, 10, and the intermediate struts, 30, of the frame, and has secured at its outer end a hand lever, 31. The upper end of the hand lever, 31, extends through a keeper, 32, having a tooth, 33, which separates the slot of the keeper into two portions, 34 and 35, and by drawing the lever forwardly it will be retained by the tooth, 33, within the portion, 34, and in that position will maintain the lever, 25, in operative position where the roller, 26, engages the shoulder, 27.

The lever, 31, is conformed to yieldingly press outwardly against the keeper so that when drawn forwardly it will automatically lock itself within the slot portion, 34. In releasing it from this position it is pressed inwardly and then rearwardly.

A spring, 36, yieldingly urges the disc, 19, against the pulley, 17, when the lever is released. A thrust bearing screw, 37, threaded into the bearing, 21, engages the lower end of the shaft, 20, through the medium of a ball bearing, 38, in order to support the shaft. Upward movement of the shaft is limited by a thrust washer, 37ª, which is secured to the shaft and engages a thrust bearing, 37ᵇ, secured to the frame member, 24.

At its upper end the shaft, 22, carries a sleeve, 39, having a central cavity, 40, traversed by a pin, 41, to receive the lower end of the propeller shaft and to allow disengagement of the propeller shaft from the propeller drive unit.

Each of the tubs, A and B, have the cylindrical side wall, 42, and the bottom, 43. A bushing, 44, is extended through the bottom, 43, to receive the propeller shaft, 45. The bushing, 44, is externally threaded, as shown in Fig. 6, and has a flange, 46, which engages the inner face of the bottom, 43. A nut, 47, is threaded onto the bushing against the lower face of the bottom, 43, and securely seals the bushing in contact with the bottom.

A packing gland, 48, is threaded onto the end of the bushing, and the spindle, 49, of the shaft extends downwardly through the gland, 48. The spindle, 49, is of smaller diameter than the shaft, 45, thus forming a shoulder which bears against a metallic bellows packing, 50, received between said shoulder and the packing gland, 48.

The lower end of the shaft, 49, is provided with a bayonet slot, 51, which receives the pin, 41, of the sleeve, 40 (see Fig. 4).

The propeller, E, has a hub, 52, which is internally screw threaded to receive the threaded upper end, 53, of the propeller shaft, 45. The wings, 54, measure approximately two and one-half inches from tip to axis of the propeller hub and are inclined at an angle, substantially constant during the entire length of the wings, of approximately 65° from the horizontal. (See Fig. 5.)

For such a propeller, rotated at a speed of approximately 1800 revolutions per minute, the tub is made approximately twenty-two inches in diameter. The depth of the tub corresponding to these dimensions is approximately thirty-six inches.

I find that this pitch is suitable for a propeller rotated at the speed given and of the size stated, although a propeller may be used having blades of less inclination from the horizontal and driven at a greater speed, or a propeller may be used having blades which are set at angles of 90° to the horizontal or coplanar with the axis of the propeller.

This latter type of propeller, as illustrated in Fig. 10, would act entirely by centrifugal force, throwing the fluid in the bottom of the tub outwardly toward the side wall, 42, and causing it thus to follow a spiraling path upward along the wall.

The propeller shown in the preferred form of the invention has the same action, throwing the fluid by centrifugal force away from the center of the lower region of the tub, giving it at the same time a rotary movement and causing it to spiral upwardly along the side wall of the tub.

The fluid is indicated generally by the reference character 55 in Fig. 6, and the direction in a vertical plane of the currents set up therein by the arrows, 56. The spiraling motion is indicated by the arrows, 57. A vortex will be created in the fluid, due to the centrifugal action of the whirling mass, and the upward currents in the outer portion thereof will cause the inner portion to move downwardly in a return path to the propeller as indicated by the arrows, 56.

I find that by inclining the propeller blades this downward sucking action is very much facilitated, especially when the propeller is first set into motion in the still mass of the fluid. The direction of rotation of the propeller is such that the inclined blades will exert a downward pull upon the fluid.

There will be at all times a slip between the propeller blades and the fluid, but I find that by using a propeller of such small size compared with the tub that the churning action of the propeller upon the fluid will be minimized.

The mixing of the fluid is accomplished mainly by the drawing action that is set up between the adjacent particles of the fluid. This is due to the fact that the propeller rotates at a much higher velocity than is ever attained by the rotating fluid. The velocity of the fluid near the axis of the tub will be much greater than that of the outer masses, partly due to the inertia of the heavier outer masses, causing them to lag behind the propeller, and due partly to the vortex which is set up in the fluid. Consequently the rotating layer of fluid without the vortex will be constantly drawing away from the next outer layer, and the latter will be constantly drawing away from the masses beyond.

This drawing action very rapidly displaces the molecules of each individual egg mass, stretching it out so as to rupture the yoke of the egg and gradually elongating it in a manner analogous to that of taffy pulling until the egg particles have been strung out to such a length that they have become intimately mixed with the other masses, likewise stretched in spiral paths extending around and through the mass.

In this particular action upon the fluid there is practically no tendency for air bubbles to become entrapped within the mass of the fluid. There is no churning or slopping of the fluid within the tub, and the surface which is exposed to the air is a smooth film.

I have experimented with agitators positioned on horizontal axes, with larger agitators, and with tubs of less height, and I find that under such conditions there is much greater tendency of the fluid to froth, due to churning.

The drawing action described above is especially suitable when a fluid having such viscosity as that of eggs is being acted upon. This viscosity increases very considerably the resistance of the fluid to any churning action, and yet where the movement is a simple rotating movement such as is had in my machine, the viscosity of the fluid does not seem to render the operation of the propeller any more difficult than would be true in a liquid such as water.

Furthermore, the viscosity of the fluid makes it difficult to force the molecules in all directions between each other, as is done in churning, whereas by giving the fluid certain well defined paths of motion which do not conflict with each other, the viscosity is overcome readily by the drawing action, and it is as easy to separate the molecules as would be the case in a strictly liquid fluid.

Returning to the mechanical structure of the machine, it will be noted that the propeller shaft, 45, may be removed by unhooking the engagement of the bayonet slot, 51, with the pin, 41. The bayonet slot connection maintains the shaft in yielding engagement with the packing, 50, and prevents the resistance of the fluid from lifting the propeller when it is in action. Removal of the propeller and its shaft is necessary for cleaning purposes, and the packing gland, 48, is at all times removed after the day's work is finished and the machines are to be cleaned.

It is very important that the particles of egg shells and foreign matter contained in the mass of fluid be collected and drawn off after every refilling of the tub. To this end I employ a sediment pocket, 58, having an inclined wall, 59, on that side of the pocket which faces the flow of the fluid. The shells and foreign matter will naturally seek the bottom of the tub during the rotation, being carried downwardly by the inner current of the fluid and drawn directly against the bottom wall, 43, by their greater inertia as compared with that of the fluid, against which they will slide until they have reached the pocket, 58, into which they will drop.

The inner wall, 60, of the pocket is extended toward the center of the tub sufficiently so that the sediment will be caught before it approaches near enough to the side wall of the tub to be affected by the upward currents in the fluid. Consequently none of the sediment will be carried upward with the fluid.

After the eggs have been mixed they are drawn off through a drain cock, 61, which is positioned at the level of the bottom, 43.

It will be noted that the fluid in the pocket, 58, will remain after the main body of the fluid has been withdrawn. This portion of the fluid in the pocket, 58, is drawn off through the drain cock, 62, and is discarded as waste or used in the manufacture of stock foods and the like.

After each tubful of eggs has been mixed the tub is flushed.

I find that the quality of the product is very markedly increased by drawing off the sediment after each operation. The sediment collecting in the pocket is much more likely to contain bacteria than the remainder of the fluid, and such bacteria would tend to contaminate the fresher batches of eggs if allowed to remain in the sediment pocket or in the bottom of the tub. Bacteria is especially likely to be found on the particles of egg shell which may be collected in the sediment pocket.

The object of inclining the wall, 59, is to bring the bottom of the sediment pocket to a narrow width which will facilitate drainage. It is desirable to have the upper extremity of the pocket much wider, to insure catching all of the foreign material, and to prevent any being carried beyond the pocket by the current. The wall opposite the wall, 59, is left vertical in order that the sediment may not become deposited thereon, as would be possible were it inclined, due to the viscosity of the fluid and the relatively small difference in specific gravity of the fluid and much of the sediment. The inclined walls will not catch sediment, since they are inclined in the direction of travel of the fluid, so that no sediment will contact with them.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a mixing machine for eggs, a tub, means located adjacent the bottom of the tub for creating an outwardly spiralling movement adjacent the bottom of the tub, in an egg mass contained therein, a sediment chamber forming a downwardly extending pocket in the bottom of the tub, said chamber having a capacity sufficient to receive all the usual foreign material contained in a tub full of egg mass, and having an unrestricted opening communicating with the tub, and a drain cock in the tub at the lower extremity thereof.

2. In a mixing machine for eggs, a tub, means for creating an outwardly spiralling movement adjacent the bottom of the tub, in an egg mass contained therein, a sediment chamber forming a downwardly extending pocket in the bottom of the tub, said chamber having a capacity sufficient to receive all the usual foreign material contained in a tub full of egg mass, and having an unrestricted opening communicating with the tub, a discharge vent for emptying the pocket, and a drain cock in the tub at the lower extremity thereof.

3. In a mixing machine for eggs, a tub, means for creating an outwardly spiralling movement adjacent the bottom of the tub, in an egg mass contained therein, a sediment chamber forming a downwardly extending pocket in the bottom of the tub, said chamber having a capacity sufficient to receive all the usual foreign material contained in a tub full of egg mass, having a vertical wall facing in a direction reverse to that of the flow of egg mass, having an opposite wall inclined downwardly and inwardly, and having an unrestricted opening communicating with the tub, and a drain cock in the tub at the lower extremity thereof.

4. In a mixing machine for eggs, a tub, means for creating an outwardly spiralling movement adjacent the bottom of the tub, in an egg mass contained therein, a sediment chamber forming a downwardly extending pocket in the bottom of the tub, said chamber having a capacity sufficient to receive all the usual foreign material contained in a tub full of egg mass, and having an unrestricted opening communicating with the tub, and a drain cock in the tub at the lower extremity thereof.

Signed at Sioux City, in the county of Woodbury and State of Iowa, this 29th day of April, 1926.

JOHN M. JUNG.